United States Patent [19]

Tanaka

[11] Patent Number: 4,884,538

[45] Date of Patent: Dec. 5, 1989

[54] DIESEL ENGINE SWIRL CHAMBER

[75] Inventor: Toshiaki Tanaka, Fujisawa, Japan

[73] Assignee: Nissan Motor Co., Ltd., Yokohama, Japan

[21] Appl. No.: 159,338

[22] Filed: Feb. 23, 1988

[30] Foreign Application Priority Data

Mar. 6, 1987 [JP] Japan .............................. 62-32815[U]

[51] Int. Cl.4 .............................................. F02B 19/08
[52] U.S. Cl. .................................... 123/263; 123/280
[58] Field of Search ............... 123/261, 262, 263, 286, 123/275, 280

[56] References Cited

U.S. PATENT DOCUMENTS 4,612,888  9/1986  Ishida et al. .......................... 123/261
4,619,229  10/1986  Imoto et al. ......................... 123/286

FOREIGN PATENT DOCUMENTS 12054  1/1980  Japan .
51909  3/1982  Japan .................................. 123/263

Primary Examiner—Tony M. Argenbright
Attorney, Agent, or Firm—Foley & Lardner, Schwartz, Jeffery, Schwaab, Mack, Blumenthal & Evans

[57] ABSTRACT

The nozzle throat through which fuel is injected into a swirl chamber is arranged so that a flame front which travels back through the plume of injected fuel is deflected and prevented from directly propagating thereinto. The orientation of the nozzle throat also reduces the amount of surface area of the throat against which the injected fuel impinges and reduces the amount of fuel which adheres thereto.

9 Claims, 2 Drawing Sheets

DIESEL ENGINE SWIRL CHAMBER

BACKGROUND OF THE INVENTION

1. Field of the Invention

The present invention relates generally to diesel engines and more specifically to an improved swirl chamber arrangement for a swirl chamber type diesel engine.

2. Description of the Prior Art

FIG. 1 shows a prior art arrangement of the nature disclosed in JM-A-55-12054. As shown, this arrangement includes an essentially cylindrical or so called "disc" shaped swirl chamber 1 which is fluidly communicated with a main combustion chamber 2 via an angled transfer port 4. The swirl chamber 1 is further is formed with a nozzle throat 6 through which a fuel injector 8 injects fuel, and a bore 10 in which a glow plug 12 is disposed.

The transfer port 4 is arranged to introduce the compressed charge from the main combustion chamber 2 in the swirl chamber 1 in a manner that the incoming flow follows the path denoted by the bold arrow A. As shown in the drawing, due to the above mentioned flow of the air, the plume of fuel which is sprayed into the swirl chamber by the injector 8, is deflected (as indicated by arrow a) in a manner to flow through the swirl chamber in the direction denoted by the bold arrow B. Some of the fuel impinges on a wall portion of the nozzle throat and is deflected as indicated by arrow b.

However, this arrangement has suffered from the drawback that unacceptably large amounts of smoke tend to be formed during engine operation.

Experiments performed have established that the reason for the large amount of smoke formation is due to the fact that, during engine operation the spontaneous ignition of the fuel within the swirl chamber tends to occur at the point denoted by *.

Following the initial ignition, even though the swirl in the chamber is flowing in the opposite direction, the flame front travels rapidly back through the fuel spray in the direction denoted by the bold arrow C as well as propagating in the forward direction. This rearward propagation direction tends to cause the flame front to travel directy into the nozzle throat 6.

As the mixing effect of the air which is induced to swirl in the swirl chamber 1, is very low in the nozzle throat 6, localized combustion of a pocket of poorly carburetted excessively rich mixture occurs and leads to the formation of a large amount of smoke.

SUMMARY OF THE INVENTION

It is an object of the present invention to provide a swirl chamber construction which obviates the combustion of excessively rich mixtures in the nozzle throat and therefore reduces the formation of smoke.

In brief, the above object is achieved by a swirl chamber arrangement wherein the nozzle throat is arranged so that a flame front which travels back through the plume of injected fuel, is deflected and prevented from directly propagating into the nozzle throat. The orientation of the nozzle throat also reduces the amount of surface area of the throat against which the injected fuel impinges and reduces the amount of fuel which adheres thereto.

More specifically, a first aspect of the present invention takes the form of an internal combustion engine which features: a swirl chamber, the swirl chamber being communicated with a main combustion chamber by way of a transfer passage, the transfer passage being arranged to, during the compression phase of the engine, introduce air into the swirl chamber in manner that it establishes a swirling air pattern therein; means defining nozzle throat through which fuel is injected into the swirl chamber; and a wall portion located adjacent the nozzle throat which deflects a flame front which propagates back through the fuel plume following ignition thereof, the wall portion being arranged to prevent the flame front from propagating directly into the nozzle throat.

A second aspect of the present invention takes the form of a diesel engine which features: a main combustion chamber; an essentially cylindrically shaped swirl chamber; a transfer port, the transfer port communicating the main combustion chamber with the swirl chamber, the transfer port being oriented to induce a swirlying air pattern to form in the swirl chamber during the compression phase of the engine; means defining a nozzle throat which opens into the swirl chamber, the nozzle throat being oriented at a first predetermined angle with respect to the swirling air pattern which is established in the swirl chamber; a fuel injector; the fuel injector being arranged at a second predetermined angle with respect to the swirling air pattern which is established in the swirl chamber, the fuel injector being arranged to inject fuel into the swirl chamber through the nozzle throat in a manner that the fuel becomes admixed with the swirling air pattern, the difference between the first and second predetermined angles reducing the surface area of the nozzle throat upon which injected fuel tends to impinge; and a deflecting wall portion, the deflecting wall portion being located immediately adjacent the nozzle throat and on the downstream side thereof with respect to the direction in which the swirling air pattern swirls in the swirl chamber, the deflecting wall portion being arranged to deflect a flame front which propagates back through the fuel injected into the swirl chamber and prevent the flame front from directly propagating directly into the nozzle throat.

DETAILED DESCRIPTION OF THE PREFERRED EMBODIMENTS

Figure 2:
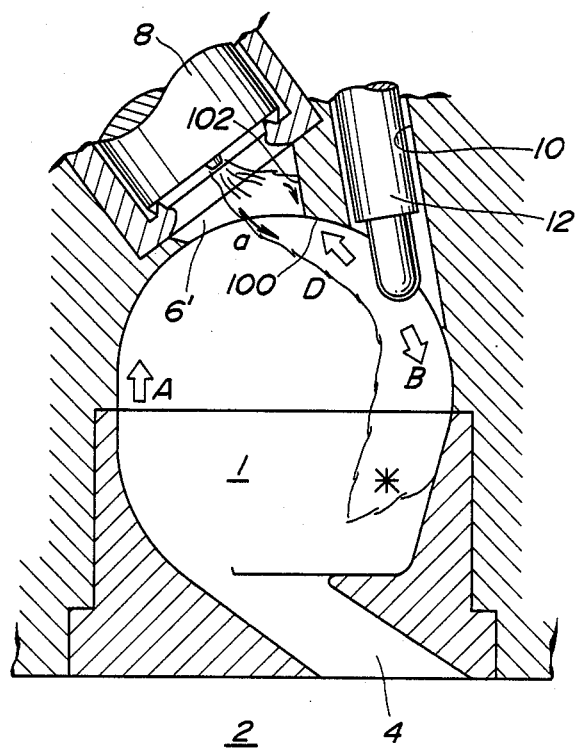
FIG. 2 is a sectional elevation of an embodiment of the present invention.

FIG. 2 shows an embodiment of the present invention. This arrangement is essentially similar to the prior art arrangement however features a nozzle throat 6' arrangement which is constructed and arranged such that the mouth of the throat is oriented in a direction which is close to normal to the direction in which the flame front propagates back through the fuel plume. This defines a deflection surface 100 between the nozzle throat 6' and the adjacent bore 10 in which the glow plug 12 is disposed. This deflection surface 100 is arranged at an angle to the flame front and substantially parallel to the swirl pattern, as shown in FIG. 2, to deflect the flame front at a location immediately upstream of the nozzle throat 6' (see bold arrow D) in a manner which prevents same from propagating directly into the nozzle throat and therefore obviates the problem encountered with the prior art wherein a pocket of poorly carburized/rich mixture undergoes combustion therein.

Figure 1:
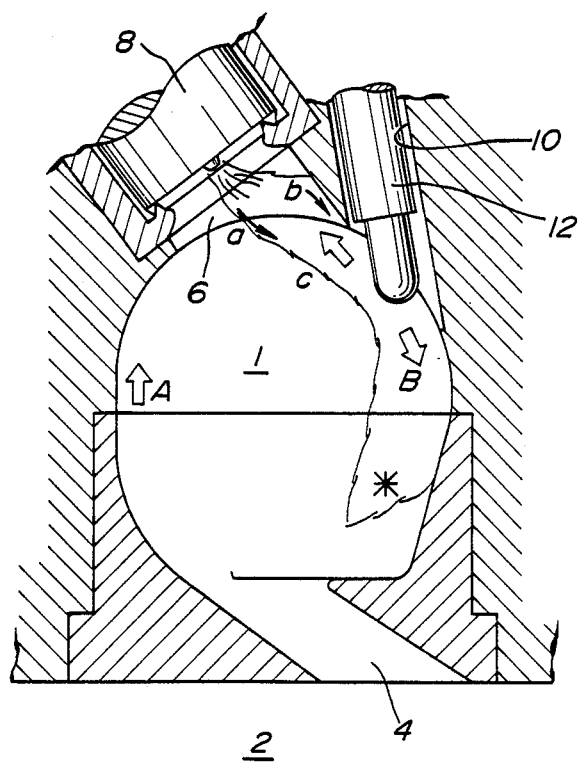
FIG. 1 is a sectional elevation of the prior art arrangement discussed in the opening paragraphs of the instant disclosure.

The orientation of the nozzle throat also reduces the surface area of the wall portion 102 against which the injected fuel impinges and subsequently adheres. Viz., by comparing FIGS. 1 and 2 it will be noted that, with the present invention, due to the formation of the deflection surface 100, the wall portion 102 of the nozzle throat 6' is more sharply angled with respect to direction in which fuel is injected than the corresponding wall portion of the prior art. This results in the surface area of the nozzle throat 6' upon which fuel impinges being reduced.

This area reduction in combination with the flame front deflection, promotes a further reduction in smoke formation.

What is claimed is:

1. In an internal combustion engine:
   a swirl chamber, said swirl chamber having a contour and being communicated with a main combustion chamber by way of a transfer passage, said transfer passage being arranged to introduce air into the swirl chamber during the compression phase of the engine thereby establishing a swirling air pattern therein;
   means defining a nozzle throat through which a fuel plume is injected into said swirl chamber;
   a means for deflecting a flame front which propagates back through the fuel plume following ignition thereof, comprising a deflecting surface located adjacent said nozzle throat and arranged to prevent said flame front from propagating directly into said nozzle throat, said deflecting surface being arranged at an angle to said flame front and substantially parallel to said swirling air pattern;
   wherein said nozzle throat has a wall portion oriented so as to be approximately normal to the swirling air pattern which is established in said swirl chamber; and
   wherein the axis of the fuel injector and the axis of the nozzle throat are inclined with respect to each other, the axis of the fuel injector being angled less steeply with respect to the swirling air pattern which is established in said swirl chamber.

2. An internal combustion engine as claimed in claim 1, wherein said swirl chamber is substantially cylindrical.

3. An internal combustion engine as claimed in claim 2, wherein said deflecting surface defines a portion of said swirling chamber.

4. An internal combustion engine as claimed in claim 3, further comprising a heating element projecting into said swirl chamber.

5. In a diesel engine;
   a main combustion chamber;
   an essentially cylindrically shaped swirl chamber;
   a transfer port, said transfer port communicating said main combustion chamber with said swirl chamber, said transfer port being oriented to induce a circular swirling air pattern to form in said swirl chamber during the compression phase of said engine;
   means defining a nozzle throat which opens into said swirl chamber, said nozzle throat being oriented at a first predetermined angle with respect to the swirling air pattern which is established in said swirl chamber;
   a fuel injector; said fuel injector being arranged at a second predetermined angle with respect to the swirling air pattern which is established in said swirl chamber, said fuel injector being arranged to inject fuel into said swirl chamber through said nozzle throat so that the fuel becomes admixed with the swirling air pattern; and
   a deflecting surface located immediately adjacent said nozzle throat and on the downstream side thereof with respect to the direction in which the swirling air pattern swirls in said swirl chamber, said deflecting surface being arranged to deflect a flame front which propagates back through the fuel injected into said swirl chamber and to prevent the flame front from propagating directly into said nozzle throat, said deflecting surface being arranged substantially perpendicular to said flame front and substantially tangent to said circular swirling air pattern.

6. In an internal combustion engine:
   a swirl chamber, said swirl chamber having a contour and being communicated with a main combustion chamber by way of a transfer passage, said transfer passage being arranged to introduce air into the swirl chamber during the compression phase of the engine thereby establishing a swirling air pattern therein;
   means defining a nozzle throat through which a fuel plume is injected into said swirl chamber;
   a means for deflecting a flame front which propagates back through the fuel plume following ignition thereof, comprising a deflecting surface located adjacent said nozzle throat and arranged to prevent said flame front from propagating directly into said nozzle throat, said deflecting surface being arranged at an angle to said flame front and substantially parallel to said swirling air pattern;
   wherein said deflecting surface conforms to the contour of said swirl chamber.

7. In an internal combustion engine
   a swirl chamber, said swirl chamber being communicated with a main combustion chamber by way of a transfer passage, said transfer passage being arranged to, during the compression phase of the engine, introduce air into the swirl chamber in a manner that it establishes a swirling air pattern therein;
   a nozzle throat, said nozzle throat being defined by a bore which opens into said swirl chamber and through which fuel from a fuel injector can be injected into said swirl chamber, said bore being arranged so as to terminate flush with the curved wall of said swirl chamber and so that deflection of the swirl in said swirl chamber is absent; and
   wall means for permitting the swirl in said swirl chamber to proceed undisturbed in said swirl chamber, for deflecting a flame which propagates back through the fuel which is injected by said fuel injector into said swirl chamber in a direction essentially opposite to that of the said swirl and for preventing said flame from proceeding directly into said nozzle throat, said wall means forming part of the curved wall of said swirl chamber, said wall means being located adjacent said nozzle throat and arranged to extend in essentially the same direction as said swirl.

8. In an internal combustion engine a swirl chamber, said swirl chamber being communicated with a main combustion chamber by way of a transfer passage, said transfer passage being arranged to, during the compression phase of the engine, introduce air into the swirl chamber in a manner that it establishes a swirling air pattern therein;

a nozzle throat, said nozzle throat being defined by a bore which opens into said swirl chamber and through which fuel from a fuel injector can be injected into said swirl chamber, said bore being arranged so to terminate flush with the curved wall of said swirl chamber and so that deflection of the swirl in said swirl chamber is absent;

a heating element for heating the charge in said swirl chamber and promoting ignition thereof, said heating element projecting into said swirl chamber and being located downstream of said nozzle throat with respect to the direction in which the swirling air pattern swirls; and wall means for permitting the swirl in said swirl chamber to proceed undisturbed in said swirl chamber, for permitting the fuel which is injected into said swirl chamber to be carried directly into contact with said heating element by the swirl, and for deflecting a flame front which propagates back through a plume which is formed by the fuel injected injector into said swirl chamber, in a direction essentially opposite to that of the said swirl, in a manner wherein said flame front is prevented from proceeding directly into said nozzle throat, said wall means forming part of the curved wall of said swirl chamber, said wall means being located adjacent said nozzle throat and arranged to extend in essentially the same direction as said swirl.

9. In an internal combustion engine a swirl chamber, said swirl chamber being communicated with a main combustion chamber by way of a transfer passage, said transfer passage being arranged to, during the compression phase of the engine, introduce air into the swirl chamber in a manner that it establishes a swirling air pattern therein;

a nozzle throat, said nozzle throat being defined by a bore which opens into said swirl chamber and through which fuel from a fuel injector can be injected into said swirl chamber, said bore being arranged so to terminate flush with the curved wall of said swirl chamber and so that deflection of the swirl in said swirl chamber is absent;

means defining a bore for receiving a heating element;

a heating element for heating the charge in said swirl chamber and promoting ignition thereof, said heating element being disposed in said bore and arranged to project into said swirl chamber and being located downstream of said nozzle throat with respect to the direction in which the swirling air pattern swirls; and a portion of said swirl chamber wall which extends directly from the bore which defines said nozzle throat to the bore in which said heating element is received, said portion of swirl chamber wall being so sized and oriented with respect to the swirl in said swirl chamber as to define means for permitting the swirl in said swirl chamber to proceed undisturbed in said swirl chamber, for permitting the fuel which is injected into said swirl chamber to be carried directly toward and into contact with said heating element by the swirl, and for deflecting a flame front which propagates back through a plume which is formed by the fuel injected by said fuel injector into said swirl chamber, in a direction essentially opposite to that of the said swirl, in a manner wherein said flame front is prevented from proceeding directly into said nozzle throat.

* * * * *